(12) United States Patent
Zhao et al.

(10) Patent No.: US 8,995,390 B1
(45) Date of Patent: Mar. 31, 2015

(54) METHOD AND APPARATUS FOR INCREASING THE SPEED OF HANDOVER IN A WIRELESS COMMUNICATIONS NETWORK

(75) Inventors: Fan Zhao, Campbell, CA (US); Ameya Damle, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 1013 days.

(21) Appl. No.: 12/605,983

(22) Filed: Oct. 26, 2009

Related U.S. Application Data

(60) Provisional application No. 61/108,688, filed on Oct. 27, 2008, provisional application No. 61/113,387, filed on Nov. 11, 2008.

(51) Int. Cl.
*H04W 4/00* (2009.01)

(52) U.S. Cl.
USPC .......................................... 370/331; 370/338

(58) Field of Classification Search
CPC ............................. H04W 28/0226; H04W 8/02
USPC .................................................. 370/329, 331
See application file for complete search history.

(56) References Cited

U.S. PATENT DOCUMENTS

| | | | |
|---|---|---|---|
| 2006/0111112 A1* | 5/2006 | Maveddat | 455/439 |
| 2006/0240825 A1* | 10/2006 | Funabiki et al. | 455/436 |
| 2009/0135783 A1* | 5/2009 | Khalil et al. | 370/331 |
| 2009/0268687 A1* | 10/2009 | Lee et al. | 370/331 |
| 2009/0303893 A1* | 12/2009 | Lee et al. | 370/252 |
| 2010/0046477 A1* | 2/2010 | Marin et al. | 370/332 |

OTHER PUBLICATIONS

R. Koodli, Ed., Mobile IPV6 Fast Handovers, Jun. 2008, Standards track, RFC5268 All pages.*

* cited by examiner

*Primary Examiner* — Brandon Renner

(57) ABSTRACT

A method and apparatus for performing a handover of an Internet packet (IP) flow from a first access router to a second access router, in which the Internet packet (IP) flow comprises one or more downlink data packets. The method includes: receiving, at the first access router, a request from a user equipment (UE) to move the IP flow from the first access router to the second access router; and in response to the request, the first access router forwarding one or more downlink data packets from the first access router to the second access router.

20 Claims, 8 Drawing Sheets

```
                                                    1500
                    1                   2               3
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                |   Type = TBD  |     Length    |
+-+-+-+-+-+-+-+-+-+-+-+-+-+-+-+-+-+-+-+-+-+-+-+-+-+-+-+-+-+-+-+-+
|      Binding ID (BID)         |     Status    |O|H|L|F|Reserved|
+-+-+-+-+-+-+-+-+-+-+-+-+-+-+-+-+-+-+-+-+-+-+-+-+-+-+-+-+-+-+-+-+
+                                                                +
:       different type of data when different flag is set       :
+                                                                +
+-+-+-+-+-+-+-+-+-+-+-+-+-+-+-+-+-+-+-+-+-+-+-+-+-+-+-+-+-+-+-+-+
```

*FIG. 15*

```
                                                    1600
                    1                   2               3
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                |         Prefix Length         |
+-+-+-+-+-+-+-+-+-+-+-+-+-+-+-+-+-+-+-+-+-+-+-+-+-+-+-+-+-+-+-+-+
+                                                                +
:                      forwarding IP Address                    :
+                                                                +
+-+-+-+-+-+-+-+-+-+-+-+-+-+-+-+-+-+-+-+-+-+-+-+-+-+-+-+-+-+-+-+-+
```

*FIG. 16*

METHOD AND APPARATUS FOR INCREASING THE SPEED OF HANDOVER IN A WIRELESS COMMUNICATIONS NETWORK

CROSS-REFERENCE TO RELATED APPLICATIONS

This disclosure claims the benefit of U.S. Provisional Application No. 61/108,688, filed Oct. 27, 2008, and U.S. Provisional Application No. 61/113,387, filed Nov. 11, 2008, which are incorporated herein by reference.

FIELD

The present disclosure generally relates to wireless networks.

BACKGROUND

Mobile IP (or IP mobility) is an Internet Engineering Task Force (IETF) standard communications protocol that is designed to allow mobile device users (or mobile nodes) to move from one network to another while maintaining a permanent IP address. Mobile IPv6 is a version of Mobile IP which enables a mobile node (MN) to maintain its connectivity to a packet data network (e.g., the Internet) during handover—e.g., when moving from one access network to another access network.

As specified in RFC 5268, the Mobile IP Fast Handover protocol aims to reduce handover latency when the mobile node moves all its flows from one source access network to one target access network with the Mobile IP protocol used. Recently, the Mobile IPv6 protocol has been extended to allow a mobile node to bind multiple care-of addresses to one home address, and furthermore, to bind a particular flow to a care-of address. Such extensions allows a mobile node to direct a specific flow to one of its interfaces and exchange flows with a home agent via different access networks simultaneously, since certain flow may be better suited to the characteristics of a certain access network. Furthermore, the PFMIP protocol is proposed to reduce handover latency when a mobile node performs a handover using PMIP.

Such extensions introduce new handover scenarios, for example, a mobile node may handover some flows from one access network to another access network while still keeping other flows on the first access network, by using the same or different mobility protocols. Techniques are disclosed herein for reducing handover latency in such scenarios.

SUMMARY

In general, in one aspect, this specification describes, inter alia, the following techniques and mechanisms.

A mechanism to enable the mobile node, which previously connects to a first set of access network(s) by using MIP protocol (e.g., a host-based mobility protocol—e.g., DSMIPv6) and then discovers and decides to connect a second set of access network(s) by using the PMIP protocol (e.g., a network-based mobility protocol), to provide indication, such as the use of fast handover for PMIP procedure, the prefix of the home address, proper means for packet forwarding, to the access routers in the first set of access network(s) in order to reduce handover delay.

A mechanism to enable the mobile node, which previously connects to a first set of access network(s) by using PMIP protocol and then discovers and decides to connect a second set of access network(s) by using the MIP protocol, to provide indication, such as the use of fast handover for MIP procedure, proper means for packet forwarding, to the first set of access network(s) in order to reduce handover delay.

A mechanism to enable the mobile node, which previously connects to a first set of access network(s) by using MIP protocol and then discovers and decides to move some flows to a second set of access network(s) by using the MIP protocol and still keep some flows on the first set of access network(s), to provide indication, such as the use of fast handover for MIP procedure, proper means for forming an IP address, proper means for packet forwarding, to the access routers in the first set of access network(s) in order to reduce handover delay.

A mechanism to enable the mobile node, which previously connects to a first set of access network(s) by using MIP protocol and then discovers and decides to move some flows to a second set of access network(s) by using the PMIP protocol and still keep some flows on the first set of access network(s), to provide indication, such as the use of fast handover for PMIP procedure, proper means for packet forwarding, to the access routers in the first set of access network(s) in order to reduce handover delay.

A mechanism to enable the mobile node, which previously connects to a first set of access network(s) by using MIP protocol and then discovers and decides to connect to a second set of access network(s) where the mobile node resides at its home link by either directly connecting to its home agent or through the GTP protocol (e.g., a network-based mobility protocol), to provide indication, such as the use of fast handover procedure, the home address and its prefix, proper means for packet forwarding, to the access routers in the first set of access network(s) in order to reduce handover delay.

A mechanism to allow the source access network and the target access network to indicate the establishment of an unidirectional tunnel for packet forwarding, for example, during the handover scenario where the mobile node previously connects to a first set of access network(s) by using PMIP protocol and then discovers and decides to connect to a second set of access network(s) where the mobile node resides at its home link by either directly connecting to its home agent or through the GTP protocol.

In general, in one aspect, this specification describes a method and apparatus for performing a handover of an Internet packet (IP) flow from a first access router to a second access router, in which the Internet packet (IP) flow comprises one or more downlink data packets. The method includes: receiving, at the first access router, a request from a UE to move the IP flow from the first access router to the second access router; and in response to the request, the first access router forwarding one or more downlink data packets from the first access router to the second access router.

BRIEF DESCRIPTION OF THE DRAWINGS

FIG. 15 illustrates an example format of an extension to the BID option.

FIG. 16 illustrates an example format of a data field for a forwarding IP address.

DETAILED DESCRIPTION

Figure 1:
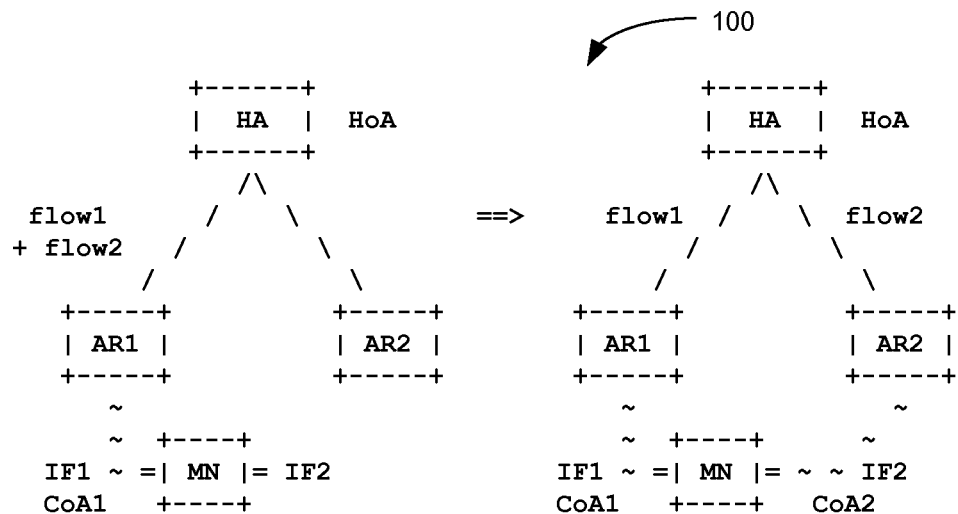
FIGS. 1-6 illustrate example handover scenarios.

FIG. 1 illustrates a first example handover scenario 100. As shown in FIG. 1, a mobile node (MN) initially exchanges both flow 1 and flow 2 (IP flows) with a home agent (HA) via an access network 1 (AR1); and later when the mobile node discovers a second access network—access network 2 (AR2)—the mobile node decides to move flow 2 from the access network 1 to the access network 2 while keeping flow 1 on the access network 1. An example of such mobile node could be a cell phone equipped with both a cellular radio and a WiFi interface. In this case, the mobile node uses Mobile IP (MIP) on both access networks.

Figure 2:
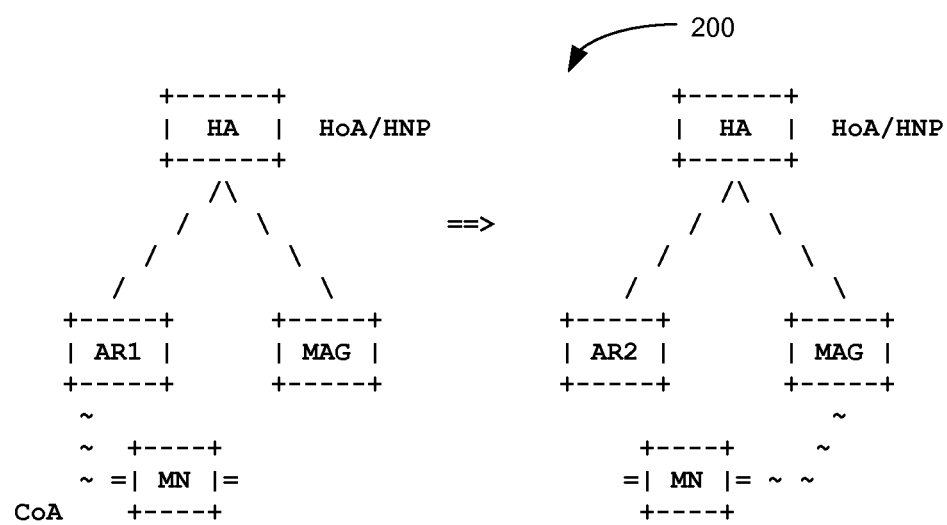

FIG. 2 illustrates a second example handover scenario 200. As shown in FIG. 2, before handover, a mobile node (MN) connects to an access network 1 (AR1) where the mobile node gains IP connectivity using MIP. When the mobile node detects access network 2 (AR2) and decides to perform a handover, the mobile node may use PMIP on the access network 2, for example, due to its configuration, preference or policy. In order to reduce handover latency, the mobile node initiates the FMIP procedure on the access network 1 and provides the indication of using PMIP on the access network 2. The access router in the access network 1 starts the PFMIP procedure with the MAG located in the access network 2. Note that it is possible that the access router in the access network 1 has MAG functionality, too.

Figure 3:
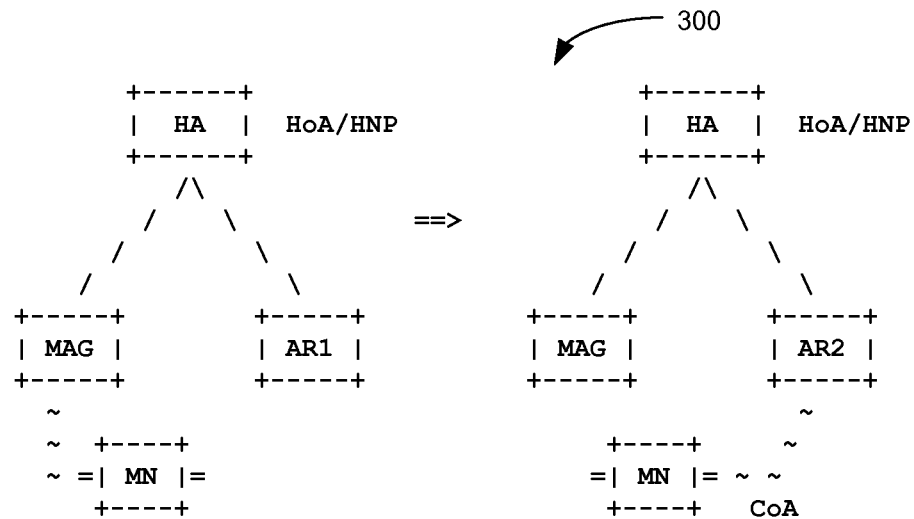

FIG. 3 illustrates a third example handover scenario 300. As shown in FIG. 3, before handover, a mobile connects to an access network 1 (AR1) where the mobile node gains IP connectivity using PMIP. When the mobile node detects access network 2 (AR2) and decides to perform a handover, the mobile node may choose to use the MIP on the access network 2, for example, due to its configuration, preference or policy. In order to reduce handover latency, with some indication, the MAG on the access network 1 starts the FMIP procedure.

Figure 4:
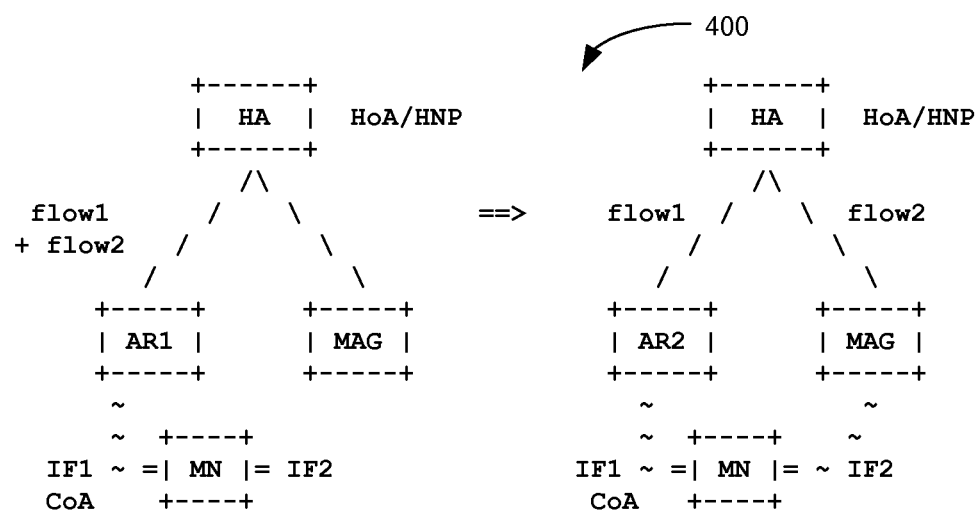

FIG. 4 illustrates a fourth example handover scenario 400. As shown in FIG. 4, a mobile node (MN) initially exchanges both flow 1 and flow 2 with a home agent (HA) via an access network 1 (AR1) using the MIP protocol; and later when the mobile node discovers access network 2 (AR2) and chooses to use the PMIP there, the mobile node decides to move flow 2 from the access network 1 to the access network 2 and maintain flow 1 on the access network 1.

In the example shown in FIG. 2, the mobile node generally needs to start the FMIP procedure on the source access network in order to reduce handover delay, since the mobile node is using MIP on the source access network and the access router in the source access network may or may support the MAG function. However, there are some problems when the FMIP protocol is applied in this case. First, with the MIP, the source access router may not even know the home address and prefix of the mobile node since the BU/BA and data packets with the HA may be encrypted. Therefore, the mobile node needs to provide the home address and prefix to the source access router so that the PAR can start the PFMIP procedure with the NMAG. However, as defined in the FMIP protocol, only NCoA is provided. Second, based on the FMIP protocol, when the PAR receives such FBU message, the PAR needs to set up a binding cache entry to bind the CoA (PCoA) with the HoA (NCoA). However, since the HoA is hosted by the home agent, packets to the mobile node will be encapsulated and then forwarded back to the home agent (i.e., PAR→HoA∥HA→CoA∥CN→HoA), which results in a loop between the home agent and the PAR. This is because the FBU message does not provide complete information to the PAR regarding how to forward packets.

FIGS. 2 and 3 show example handover scenarios when the mobile node moves between the PMIP domain and the access network that is the foreign link from the Mobile IP's perspective. When the mobile node resides in the PMIP domain, the mobile node is at its home link because the MAG emulates the home link and acts as the access router for the mobile node. There is another kind of home link where the mobile node either directly connects to the home agent or through the GTP protocol. When residing on such home link, the home agent acts as the first access router for the mobile node.

Figure 5:
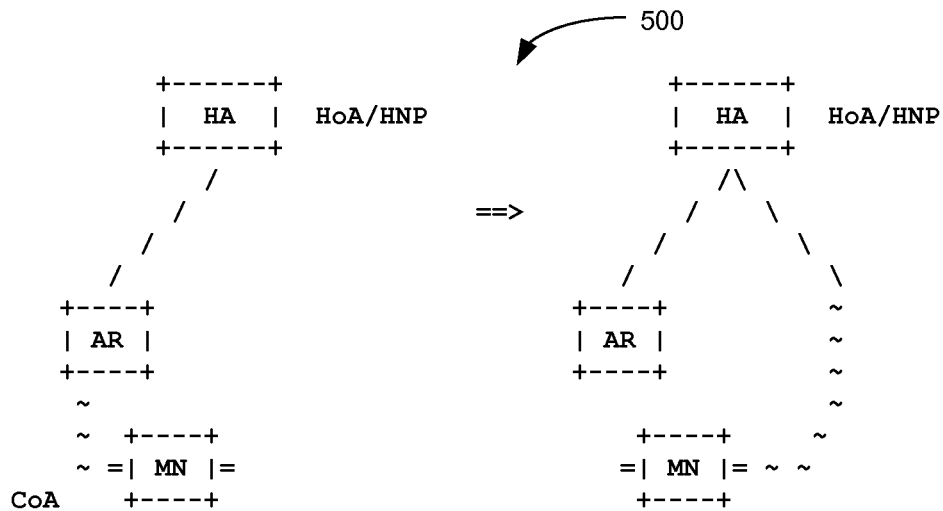

FIG. 5 illustrates an example handover scenario 500 in which a mobile node (MN) moves from a foreign link to a home link. In this scenario, although the mobile node can send uplink packets immediately when attaching to its home link, packets received by the source access router could be lost. Therefore, a mechanism to reduce packet loss during such handover is described in detail below. In the scenario shown in FIG. 5, the mobile node needs to start the FMIP procedure on the source access network (i.e., the foreign link for the mobile node) in order to reduce handover delay, since the mobile node is using MIP on the source access network. However, there are some problems (as described below) when the FMIP protocol is applied in this case.

First, with the MIP, the source access router may not even know the home address and prefix of the MN since the BU/BA and data packets with the HA may be encrypted. Therefore, the MN needs to provide the home address and prefix to the source access router so that the PAR (i.e., the home agent) can start to buffer packets forwarded from the PAR. However, as defined in the FMIP protocol, only NCoA is provided.

Second, based on the FMIP protocol, when the PAR receives such FBU message, the PAR needs to set up a binding cache entry to bind the CoA (PCoA) with the HoA (NCoA). However, since the HoA is hosted by the home agent, packets to the mobile node will be encapsulated and then forwarded back to the home agent (i.e., PAR→HoA∥HA→CoA∥CN→HoA). If the home agent still maintains the binding update cache, the home agent will forward such packets back to the PAR, which results in a loop between the home agent and the PAR. Therefore, the mobile node needs to indicate to the PAR in the FBU message, and the PAR needs to indicate to the NAR (i.e., the home agent) in the HI message that the mobile node is returning home and the home agent should buffer received packets for the mobile node without forwarding them based on the binding cache entry. To solve this problem, the FBU message and the HI message specified in Koodli, R., "Mobile IPv6 Fast Handovers", RFC 5268, June 2008 (incorporated herein by reference), are extended to carry necessary information to the PAR and the NAR.

Figure 6:
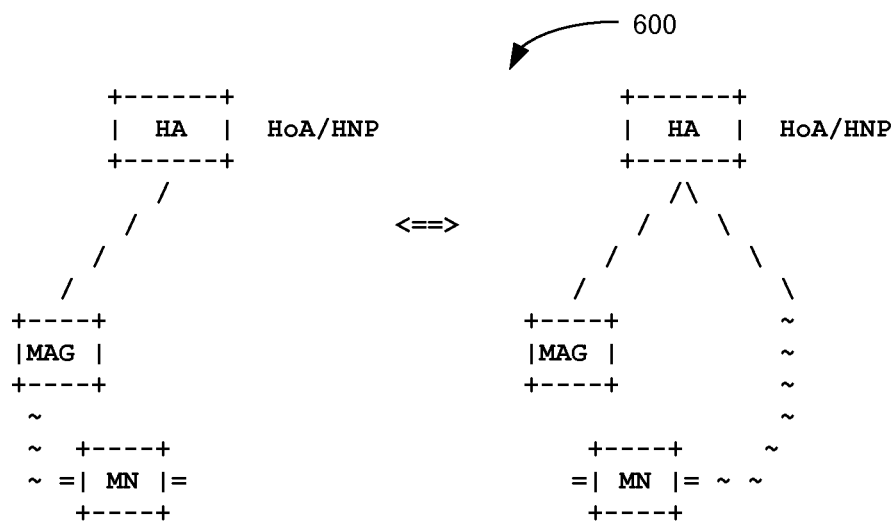

FIG. 6 shows a handover scenario 600 in which a mobile node (MN) moves from a PMIP based home link to another home link where the MN directly connects to the home agent or through the GTP protocol. In this scenario, although the mobile node can send uplink packets immediately when attaching to its target home link, packets received by the source MAG could be lost. Therefore, a mechanism is described below to reduce packet loss during such a handover scenario. Based on the PFMIP protocol, when the PAR (the MAG) receives such FBU message, the PAR needs to send the HI message to the home agent in this case to set up bi-directional tunnel between them. However, this causes packets to go through a non-optimized route, or even a loop. To solve this problem, the HI and HAck message are extended to indicate whether traffic will be forwarded on certain direction.

Note that in FIG. 2, FIG. 3, FIG. 5, and FIG. 6, the mobile node could be a either single-radio or dual-radio mobile terminal. Such figures do not suggest that the mobile node is a dual-radio terminal only. On the other hand, in FIG. 1 and FIG. 4, the mobile node is a dual-radio terminal only.

Figure 7:
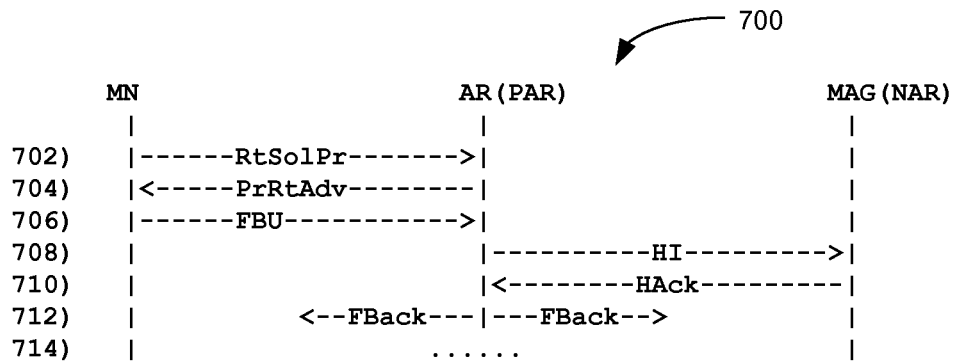
FIGS. 7-8 illustrate example handover procedures.

FIG. 7 illustrates an example predictive fast handover procedure 700 that may be implemented in a handover scenario—e.g., one or more of the example handover scenarios described above. When a mobile node (MN) detects an available new access network using a link layer specific mechanism, the mobile node requests more information by sending a RtSolPr message (step 702). Note that this message may be skipped if the mobile node knows about this new access network based on the AP-ID. The mobile node receives a PrRtAdv message either as a response or as an unsolicited message sent by the AR (step 704). The mobile node chooses to perform handover and maintain session continuity by using the PMIP on the new access network. How the mobile node selects the mobility protocol is not specified in this document. For example, the mobile node may be pre-configured with the information regarding the AP-ID, including if the PMIP should be used on such access network, or the PrRtAdv message provides such indication to the mobile node.

The mobile node sends a FBU message to the AR (i.e., the PAR) to register a binding between its home address and the current PCoA (the home address from the perspective of the AR) (step 706). In addition, the mobile node indicates that the AR should perform the PFMIP with the MAG (i.e., NAR) in the access network 2. The information provided by the mobile node in this message includes the MN_ID, MN-HoA, MN IID, the HA address etc. Therefore, data packets sent to the MN through the HA, i.e. HA→CoA∥CN→HoA, will be first encapsulated by the AR, i.e., AR→HoA∥HA→CoA∥CN→HoA, and then forwarded through the tunnel between the AR and the MAG.

The AR sends a HI message to the MAG based on the PFMIP protocol (step 708). The MAG replies with a HAck message based on the PFMIP protocol (step 710). The AR sends a FBack message once the AR receives the HAck message (step 712). The rest of the procedure (indicated by step 714) is the same as described in the PFMIP protocol. Note that when the AR sends the HI message to indicate that the packet forwarding is completed, the AR also deletes the binding between the CoA (i.e., the PCoA) and the HoA. The mobile node may send the FBU through the access network 2 to trigger such actions at the AR, for example after a configurable length of time.

Figure 8:
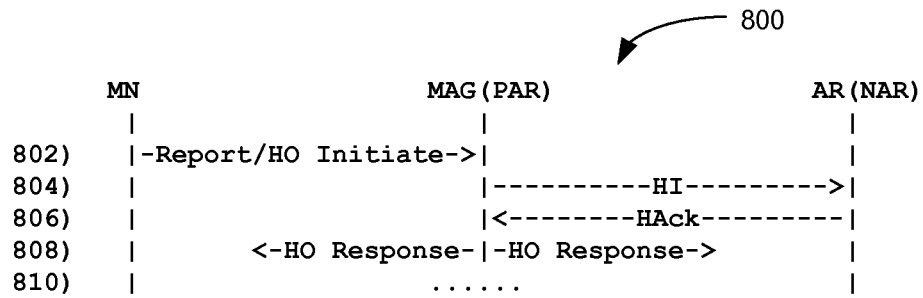

FIG. 8 illustrates an example predictive fast handover procedure 800 that may be implemented in a handover scenario—e.g., one or more of the example handover scenarios described above. When the mobile node detects an available new access network using a link layer specific mechanism, the mobile node may decide to perform handover. Besides what is described in the PFMIP protocol, the mobile node may provide the indication of using the MIP on the target access network (step 802). How the mobile node make such decision is not specified in this document. Furthermore, additional information may be provided to the MAG to trigger the FMIP protocol in a link specific way or in one or more appropriate signaling messages. A binding between the HoA and the NCoA can be considered being created at the MAG. The MAG sends the HI message to the AR as specified in the FMIP protocol (step 804). The AR replies with a HAck message as specified in the FMIP protocol (step 806). The MAG provides a notification to the mobile node in a similar way to the FBack message (step 808). Such notification may be provided in a link specific way or in one or more appropriate signaling messages. The rest of the procedure (indicated by step 810) is similar to what is specified in the FMIP protocol.

Figure 9:
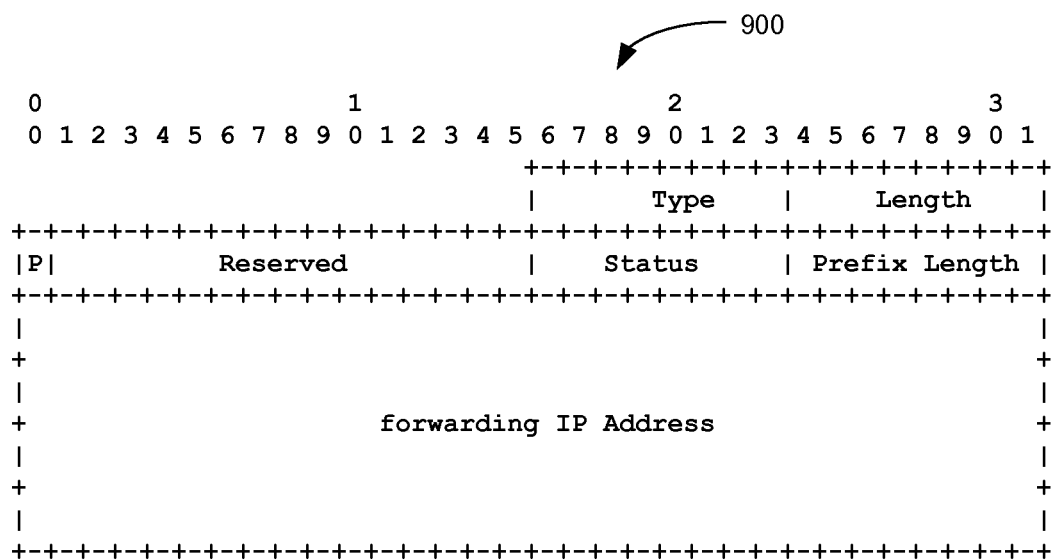
FIG. 9 illustrates an example format of a forwarding IP address mobility option.

FIG. 9 illustrates an example format 900 of a forwarding IP address mobility option. Note that the format 900 is for illustration purposes only, and other formats are also possible. The PFMIP protocol describes some options for both ICMP messages and Mobility Headers. Such options can be used in the FBU message. However, it is not clear how a mobile node indicates to the AR that certain packets need to be forwarded through a tunnel established between the AR and the (new) MAG. FIG. 9 illustrates a format 900 of a forwarding IP address mobility option that can be used in either the FBU message or the FBA message.

The format 900 includes the following fields. P (1 bit)—in one implementation, this bit must be set to 1 when the mobile node requests the traffic destined at this forwarding IP address must be forwarded through a tunnel set up by the PFMIP protocol. The forwarding IP address—one IPv6 or one IPv4 address used for packet forwarding. The forwarding IP address can be the home address of the mobile node. The type of the address in this field can be determined by the Length field. Status—the status of such request. Prefix Length—the length of the forwarding IP address. Such prefix information may be needed in the HI/HAck messages for the target MAG to know the prefix length. One new status code is defined for the FBA message. 132: The Alt-CoA option is missing the received FBU message. This can be used for the mobile node to detect that the AR does not support the forwarding IP address option since normally with the FMIP protocol, the Alt-CoA option must be included in the FBU message if sent from the PAR link, and with the extension described in this document, the forwarding IP address option replaces the Alt-CoA option.

Extensions for Handover Scenario of FIG. 5

Figure 10:
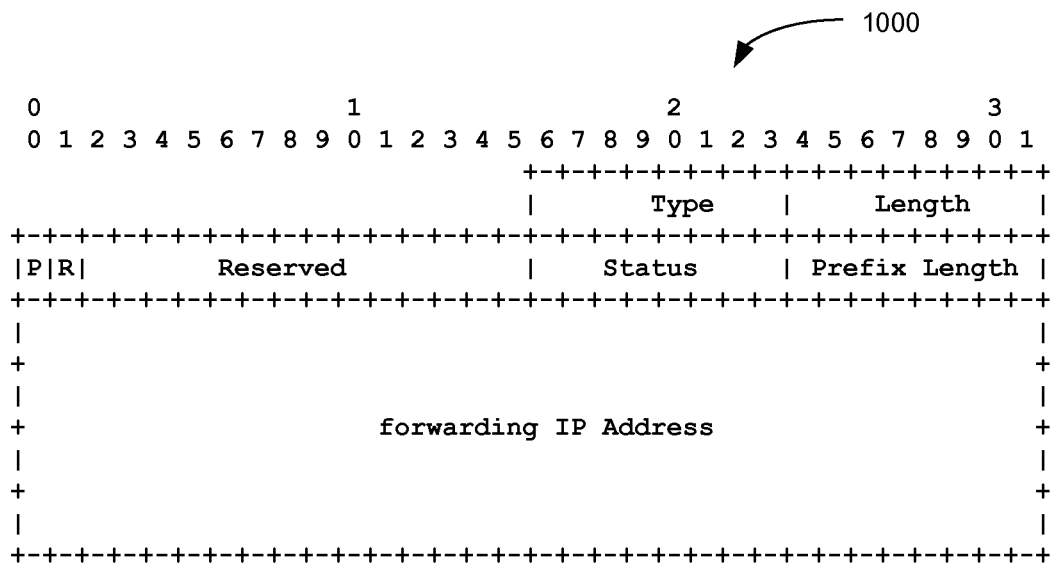
FIG. 10 illustrates an example format of a Forwarding IP Address option.

To solve the problem related to the handover scenario shown in FIG. 5, an extension to the FBU message and the HI message is provided to indicate that the mobile node is returning home. Therefore, when the NAR (i.e., the home agent) receives such indication, the home agent will not forward packets based on the binding cache entry. To do so, one way is to reserve a bit (called 'R' bit) in the Forwarding IP Address option and the HI message, as shown in the format 1000 of FIG. 10.

Specifically, the format 1000 includes the following fields. R (1 bit)—in one implementation, this bit must be set to 1 when the mobile node performs a handover to its home link where the mobile node directly connects to the home agent or through the GTP protocol. Other fields—same as described above in connection with FIG. 9.

Figure 11:
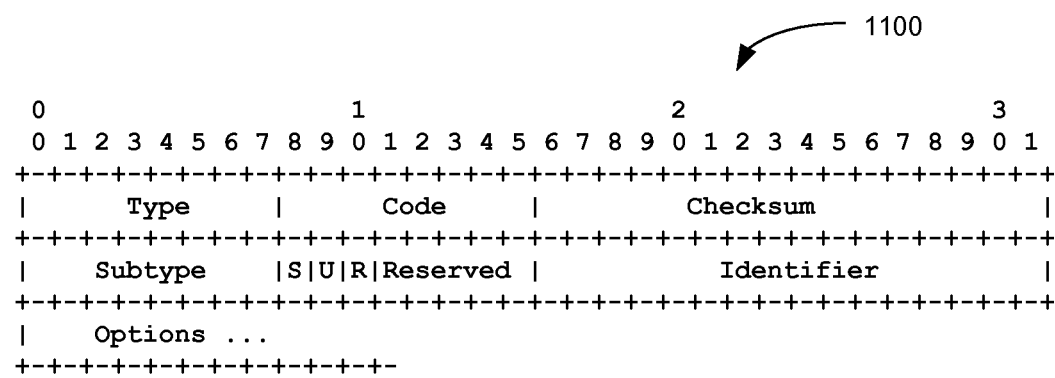
FIG. 11 illustrates an example of a Handover Initiate (HI) message.

When the PAR receives a FBU message with the 'R' bit set, the PAR considers that the mobile node moves to its home link. The PAR sends an extended HI message 1100 as shown in FIG. 11 to the NAR (i.e., the home agent). Referring to FIG. 11, in one implementation, the R (1 bit) field must be set to 1 when the R bit in the FBU is set. When the home agent receives a HI message with the R bit set, the home agent must buffer packets destined at the mobile node's home address without forwarding the packets based on the binding cache entry.

Extensions for Handover Scenario of FIG. 6

In references—Koodli, R., "Mobile IPv6 Fast Handovers", RFC 5268, June 2008, and IETF draft, draft-yokota-mipshop-pfmipv6-03, "Fast Handovers for PMIPv6", http://www.ietf.org/internet-drafts/draft-yokota-mipshop-pfmipv6-03.txt—only the HI message can carry the U and F flags. For example, in the IETF draft, if the F flag is included in the HI message, a bi-directional tunnel by default will be established for packet forwarding. In order to indicate that a unidirectional tunnel needs to be set up, both the HI and HAck messages are extended so that if a F flag is included in either message, this means that the sender of this message requests the receiver of this message to accept forwarded packets; if the F flag is not included in either message, this means that the sender of this message will not forward packets to the receiver of this message.

Figure 12:
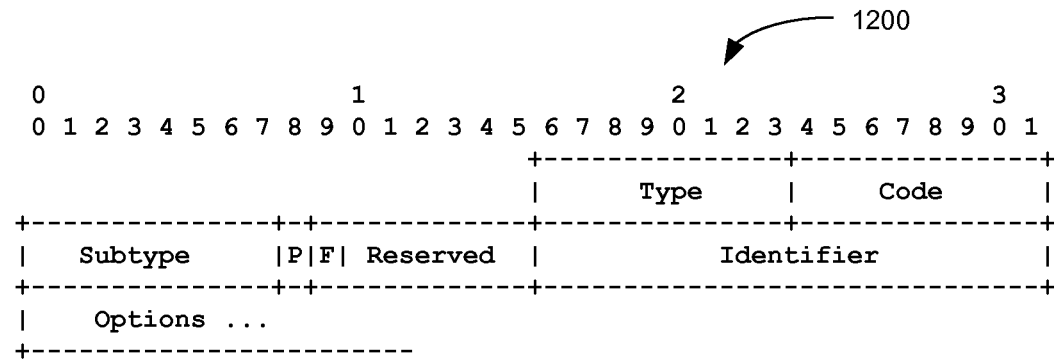
FIG. 12 illustrates an example format of a Handover Acknowledgement (HAck) Mobility Header.
Figure 13:
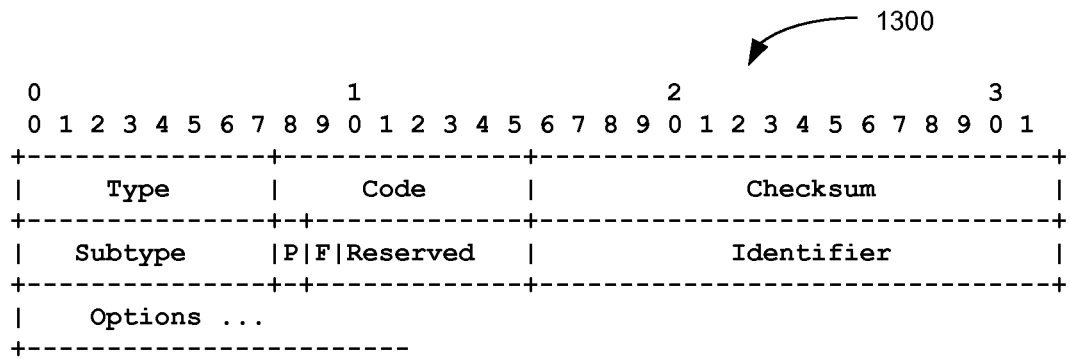
FIG. 13 illustrates an example format of a Handover Acknowledgement (HAck) ICMP Message.

FIG. 12 illustrates an example format 1200 of a Handover Acknowledge (HAck) Mobility Header. In one implementation, the F (1 bit) field within the format 1200 must be set to 1 when the NAR wants to forward packets to the PAR. Once the PAR receives such HAck message, the PAR must prepare to accept such forwarded packets. The HAck message can also be an ICMP message. FIG. 13 shows a format 1300 of such message with the F bit defined. Referring to FIG. 13, in one implementation, the F (1 bit) field must be set to 1 when the NAR wants to forward packets to the PAR. Once the PAR receives such HAck message, the PAR must prepare to accept such forwarded packets.

Mobility Scenarios for IP Mobility

To support IP flow mobility as shown in the handover scenario 100 of FIG. 1, most messages defined in the Mobile IPv6 Fast Handover protocol do not need to be changed, such as the RtSolPr message, the PrRtAdv message, the UNA message, the HI message and the HAck message. The most notable differences are for the FBU message and FBA message. This is because the mobile node needs to provide flow information to the NAR and receive a response from the NAR.

In the following, we focus our discussion on the predictive mode in the handover scenario 100 shown in FIG. 1. In this scenario, the mobile node needs to tell the AR1 (i.e., the NAR) that flow 1 needs to be forwarded to the CoA1 (i.e., the PCoA) and flow 2 needs to be forwarded to the CoA2 (i.e., the NCoA). The BID mobility option described in IETF draft, draft-ietf-monami6-multiplecoa-09, Multiple Care-of Addresses Registration, http://tools.ietforg/id/draft-ietf-monami6-multiplecoa-09.txt and the FID mobility option described in IETF draft, draft-ietf-mext-flow-binding-00, Flow Bindings in Mobile IPv6 and Nemo Basic Support, http://www.ietforg/internet-drafts/draft-ietf-mext-flow-binding-00.txt can be used to carry such information in the FBU and FBA to bind flow 1 to CoA1 and flow 2 to CoA2 at the AR1 while the Mobile IPv6 Fast Handover protocol currently only supports binding the CoA2 with the CoA1.

In other words, it seems that the mobile node registers two flow bindings at the AR1 to direct two different flows to the interface connecting to both a "home link" (the access network 1 is a "home link" for the CoA1) and a "foreign link" (the access network 2 is a "foreign link" for the CoA1) simultaneously. The case can be handled by the Multiple CoA draft where a 'H' bit is set in the BID option together with an empty care-of address field to indicate the simultaneous use of both the home link and the foreign link. Furthermore, for a specific scenario as shown in FIG. 1, it may look plausible that in the FBU message the mobile node only specify flow 2 together with the CoA2 in the Alt-CoA option. However, the mobile node needs to also specify either a default flow binding or a flow binding for the CoA1; otherwise, the AR1 does not know where to forward flow 1. Another possible way is that the mobile node sends two separate FBU messages to the AR1; however, it results in more packet overheads and potential packet loss, for example, when the AR1 does not receive or process these two messages all together, and therefore one flow filter is installed long before another.

However, during fast handover, the prospective new CoA formulated by the mobile node may not be valid at the NAR, therefore a new NCoA needs to be provided in the FBA. Currently, there is no corresponding status code defined in the multiple CoA draft (this is because the multiple CoA draft is addressing a different issue). Furthermore, with the solution for the point-to-point link mode proposed in Xia, F. and B. Sarikaya, "Prefix Management for Mobile IPv6 Fast Handover on Point-to-Point Links", draft-xia-mipshop-fmip-ptp-02, February 2008, the PAR and the NAR create states (i.e., allocating a dedicated prefix) by exchanging the HI/HAck after the MN sends the RtSolPr message and before sending the FBU message.

Figure 14:
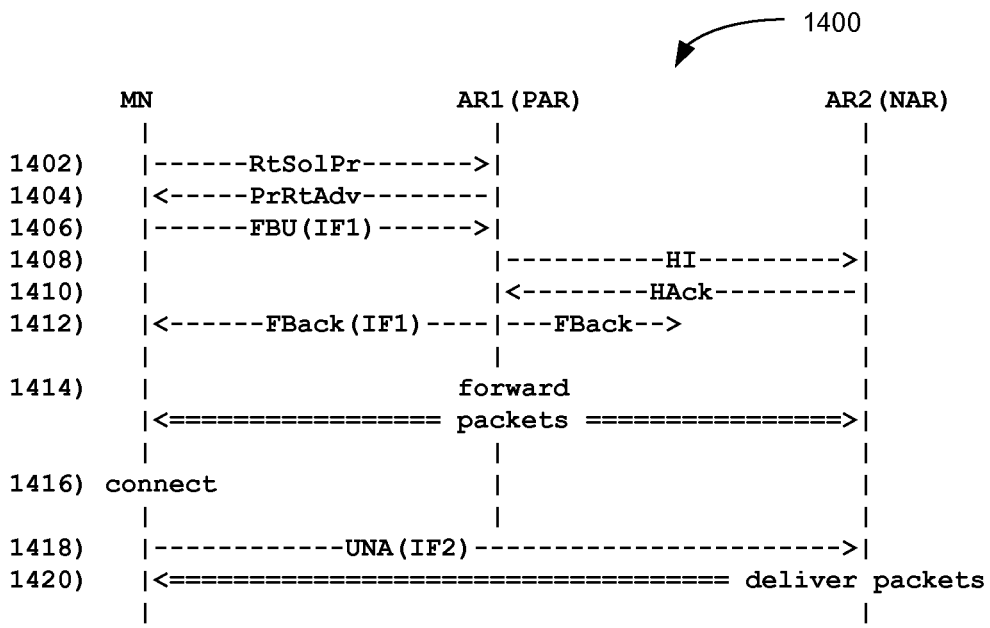
FIG. 14 illustrates an example handover procedure.

In one aspect of this disclosure, we propose that the mobile node provides information for the stateless NCoA configuration in the FBU to the NAR, without knowing the dedicated prefix valid at the NAR at first. Then the PAR is informed about the dedicated prefix from the NAR when receiving a HAck message as a response to the HI message exchange. Then, the PAR returns such information to the mobile node by sending a FAck to the mobile node's interface connecting to the PAR link. Finally, the mobile node configures such IP address on the interface connecting to the NAR link. The Mobile IPv6 Fast Handover protocol defines a LLA mobility option; however, the BID option is not defined to carry such information for stateless IP address configuration at the NAR link (in fact, the LLA option used in such draft is for packet forwarding on the home link). Therefore, we propose to extend the BID option to include the LLA address inside. FIG. 14 illustrates a predictive fast handover procedure 1400 for the first handover scenario—e.g., the handover scenario 100 of FIG. 1.

Referring to FIG. 14, when the MN detects an available new access network (e.g., by using a link layer specific mechanism), the mobile node requests more information by sending a RtSolPr message (step 1402). The mobile node receives the PrRtAdv message either as a response or as an unsolicited message sent by the AR1 (step 1404). The mobile node chooses to perform handover and maintain session continuity by using the MIP on the new access network. And the mobile node may configure a CoA2 (i.e., NCoA). The mobile node sends a FBU message to the AR1 (i.e., the PAR) to bind the flow 1 to the CoA1 and bind the flow 2 to the CoA2 (step 1406). If the mobile node knows the AR2 link is a point-to-point link, the mobile node provides the information for stateless IP configuration in the BID and binds the flow 2 to such BID even though the mobile node does not know about the dedicated prefix valid at the AR2 link yet.

The AR1 sends a HI message to the AR2 based on the Mobile IPv6 Fast Handover protocol (step 1408). The AR1 may request a dedicated prefix if the AR1 receives a BID containing only the information for stateless IP configuration instead of an IP address. The AR2 returns a HAck message (step 1410). The AR2 may also include a dedicated prefix if requested. The AR1 sends a FBack message back to the mobile node (i.e., the IF1) once the AR1 receives the HAck message. Based on the dedicated prefix, if included, the AR1 then updates the IP address (i.e., the NCoA) for the mobile node. The AR1 forwards the corresponding packets in different flows to the mobile node and the AR2 accordingly (step 1414). The IF2 on the mobile node connects to the AR2 link (step 1416). The mobile node sends a UNA message to the AR2 (step 1418). The AR2 delivers buffered packets to the mobile node (step 1420).

Described below is the case when a MN uses different mobility protocols on different access networks. Also described below are some extensions to allow the MN to tell the access router to forward traffic through a tunnel established through the PFMIP protocol. Similar extensions are also needed in the handover scenario 400 illustrated in FIG. 4 except that in order to support IP flow mobility, such indication needs to be provided in the BID option.

FIG. 15 illustrates an example format 1500 for the BID option. Note that the format 1500 is for illustration purpose only. Other formats are also possible. The following status code (TBD less than 128) is defined to be carried in the status field of the FBA message: FBU accepted but NCoA is invalid. Use NCoA supplied in the BID. The following status code (TBD less than 128) is defined to be carried in the status field of the BID option: COA INVALID: Use CoA supplied in the BID instead.

The format 1500 includes the following fields. L (1 bit)—in one implementation, this bit MUST be set to 1 when a LLA is provided in the option. Note that the L bit and the F bit cannot be set as 1 at the same time. F (1 bit)—in one implementation, this bit MUST be set to 1 when a forwarding IP address is provided in the option. Note that the L bit and the F bit cannot be set as 1 at the same time. Data—the LLA: the variable length link-layer address, used together with the dedicated prefix allocated for the MN at the NAR link by the NAR to generate a NCoA for flow binding. The forwarding IP address: One IPv6 or one IPv4 address used for packet forwarding. The forwarding address can be the home address of the MN. The type of the address in this field can be determined by the Length field. FIG. 16 illustrates an example format 1600 of such a data field.

One or more of the procedure steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 17:
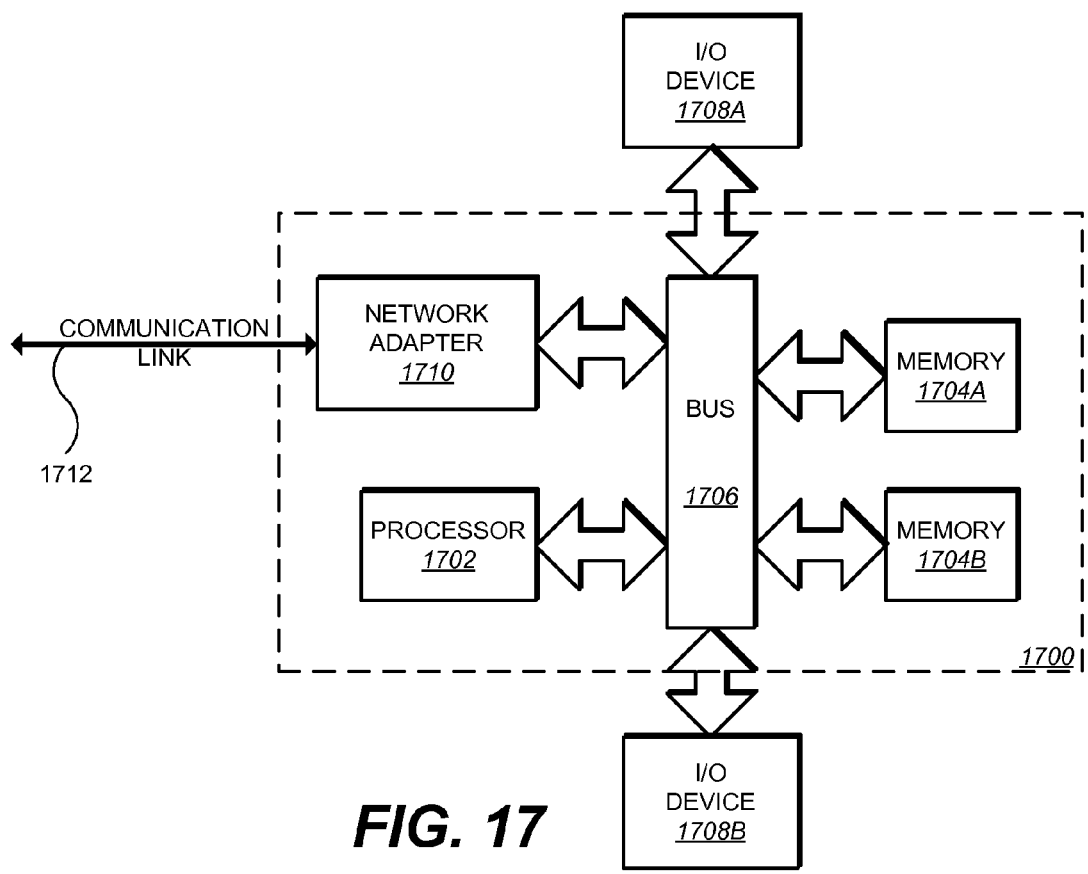
FIG. 17 is a block diagram of a data processing system (e.g., a mobile node) suitable for storing and/or executing program code.

FIG. 17 illustrates a data processing system 1700 (e.g., a mobile node) suitable for storing and/or executing program code. Data processing system 1700 includes a processor 1702 coupled to memory elements 1704A-B through a system bus 1706. In other implementations, data processing system 1700 includes more than one processor and each processor can be coupled directly or indirectly to one or more memory elements through a system bus. Memory elements 1704A-B can include local memory employed during actual execution of the program code, bulk storage, and cache memories that provide temporary storage of at least some program code in order to reduce the number of times the code must be retrieved from bulk storage during execution. As shown, input/output or I/O devices 1708A-B (including, but not limited to, keyboards, displays, pointing devices, etc.) are coupled to data processing system 1700. I/O devices 1708A-B may be coupled to data processing system 1700 directly or indirectly through intervening I/O controllers (not shown).

In one implementation, a network adapter 1710 is coupled to data processing system 1700 to enable data processing system 1700 to become coupled to other data processing systems or remote printers or storage devices through communication link 1712. Communication link 1712 can be a private or public network. Modems, cable modems, and Ethernet cards are just a few of the currently available types of network adapters.

Although the subject matter has been described in language specific to structural features and/or methodological operations, the subject matter defined in the appended claims is not necessarily limited to the specific features or acts described above, including orders in which the acts are performed.

What is claimed is:

1. A method for performing a handover of an Internet packet (IP) flow from a first access router to a second access router, the IP flow comprising one or more data packets, the method comprising:

receiving, at the first access router, a request from a user equipment (UE) to move the IP flow from the first access router to the second access router;

in response to the request, the first access router: (i) registering a binding of a home address of the UE to a care-of address assigned to the UE for the one or more data packets of the IP flow, and (ii) transmitting a handover initiation (HI) message including (i) a first flag, wherein the first flag indicates that (i) the UE is returning to a home network associated with the home address and (ii) the second access router is to buffer the one or more data packets of the IP flow forwarded from the first access router via a first unidirectional tunnel from the first access router to the second access router; and in further response to the request, and based at least in part on i) the binding of the home address to the care-of address and ii) receipt of a handover acknowledgement (HAck) message from the second access router acknowledging the handover initiation (HI) message, the first access router encapsulating and forwarding the one or more data packets of the IP flow from the first access router to the second access router via the first unidirectional tunnel.

2. The method of claim 1, further comprising:

buffering the one or more data packets at the second access router; and in response to the second access router receiving a location update message from the UE, sending the one or more data packets buffered at the second access router to the UE.

3. The method of claim 2, wherein prior to receiving the location update message from the UE, the second access router
receiving the one or more data packets from the UE, and forwarding, to the first access router, the one or more data packets received from the UE.

4. The method of claim 2, wherein the buffering is in response to the indication that the UE is returning to the home network associated with the home address.

5. The method of claim 1, wherein the request indicates that the first access router is to refrain from moving one or more other IP flows associated with the UE to the second access router.

6. The method of claim 5, further comprising maintaining the one or more other IP flows with the first access router subsequent to the move of the IP flow to the second access router.

7. The method of claim 6, further comprising the first access router providing the UE with a new care-of address of the second access router.

8. The method of claim 1, wherein the request further includes an indication of a particular handover protocol to initiate with the second access router, and the method further includes, in response to the request, the first access router initiating the particular handover protocol with the second access router to move the IP flow from the first access router to the second access router.

9. The method of claim 1, wherein the request includes:
i) the home address of the UE, and
ii) an indication to register a binding of the home address and a current care-of address.

10. The method of claim 1, wherein the one or more data packets are one or more first data packets, the method further comprising:
the first access router receiving the HAck message from the second access router, the HAck message including a second flag, wherein the second flag indicates that the first access router is to accept one or more second data packets of the IP flow forwarded from the second access router to thereby establish a second unidirectional tunnel from the second access router to the first access router;
the first access router receiving the one or more second data packets of the IP flow forwarded from the user equipment (UE) via the second access router via the second unidirectional tunnel; and
forwarding the one or more second data packets, from the first access router to a home agent of the user equipment (UE), based at least on the second flag being present in the HAck message.

11. The method of claim 5, wherein the request includes a fast binding update (FBU) that indicates a stateless binding for the IP flow.

12. A method for performing a handover of an Internet packet (IP) flow from a first access router to a second access router, the IP flow comprising one or more data packets, the method comprising:
receiving, at the first access router, a request from a user equipment (UE) to move the IP flow from the first access router to the second access router;
in response to the request, the first access router (i) registering a binding of a home address to a care-of address, and (ii) transmitting a handover initiation (HI) message including a first flag, wherein the first flag indicates that the UE is returning to its home network; and
in further response to the request, and based at least in part on (i) the binding of the home address to the care-of address and (ii) receipt of a handover acknowledgement (HAck) message from the second access router acknowledging the handover initiation (HI) message, the first access router encapsulating and forwarding one or more downlink data packets of the IP flow from the first access router to the second access router.

13. The method of claim 12, further comprising the second access router refraining from forwarding packets to the mobile node via the first access router in response to the HI message including the first flag.

14. The method of claim 12, wherein the request indicates that the first access router is to refrain from moving one or more other IP flows associated with the UE to the second access router.

15. The method of claim 12, further comprising maintaining the one or more other IP flows with the first access router subsequent to the move of the IP flow to the second access router.

16. The method of claim 12, wherein the request includes a fast binding update (FBU) that indicates a stateless binding for the IP flow.

17. An access router, comprising:
at least one processor;
memory; and
program code stored on the memory and executable by the at least one processor to:
receive from another access router a handover initiation (HI) message including (i) a first flag, wherein the first flag indicates that (i) a UE is returning to a home network associated with a home address of the UE and (ii) the access router is to buffer one or more data packets of an Internet Protocol (IP) flow forwarded from the other access router to thereby establish a first unidirectional tunnel from the other access router to the access router;
buffer the one or more data packets; and
in response to the access router receiving a location update message from the UE, send the one or more data packets buffered at the access router to UE.

18. The access router of claim 17, wherein the one or more data packets are one or more first data packets, and wherein the program code is further executable by the at least one processor to:
receive one or more second data packets of the IP flow from the UE, and
forward, to the other access router, the one or more second data packets received from the UE.

19. The access router of claim 17, wherein the program code is further executable by the at least one processor to buffer the one or more data packets in response to the indication that the UE is returning to the home network associated with the home address.

20. The access router of claim 17, wherein the one or more data packets are one or more first data packets, and wherein the program code is further executable by the at least one processor to transmit to the other access router a handover acknowledgement (HAck) message, the HAck message including a second flag, wherein the second flag indicates that the other access router is to accept one or more second data packets of the IP flow forwarded from the access router to thereby establish a second unidirectional tunnel from the access router to the other access router.

* * * * *